Feb. 22, 1949.        J. MYKIATIUK         2,462,537
            SAFETY HOUSING FOR GAS BURNER GRILLS
                     Filed May 1, 1946
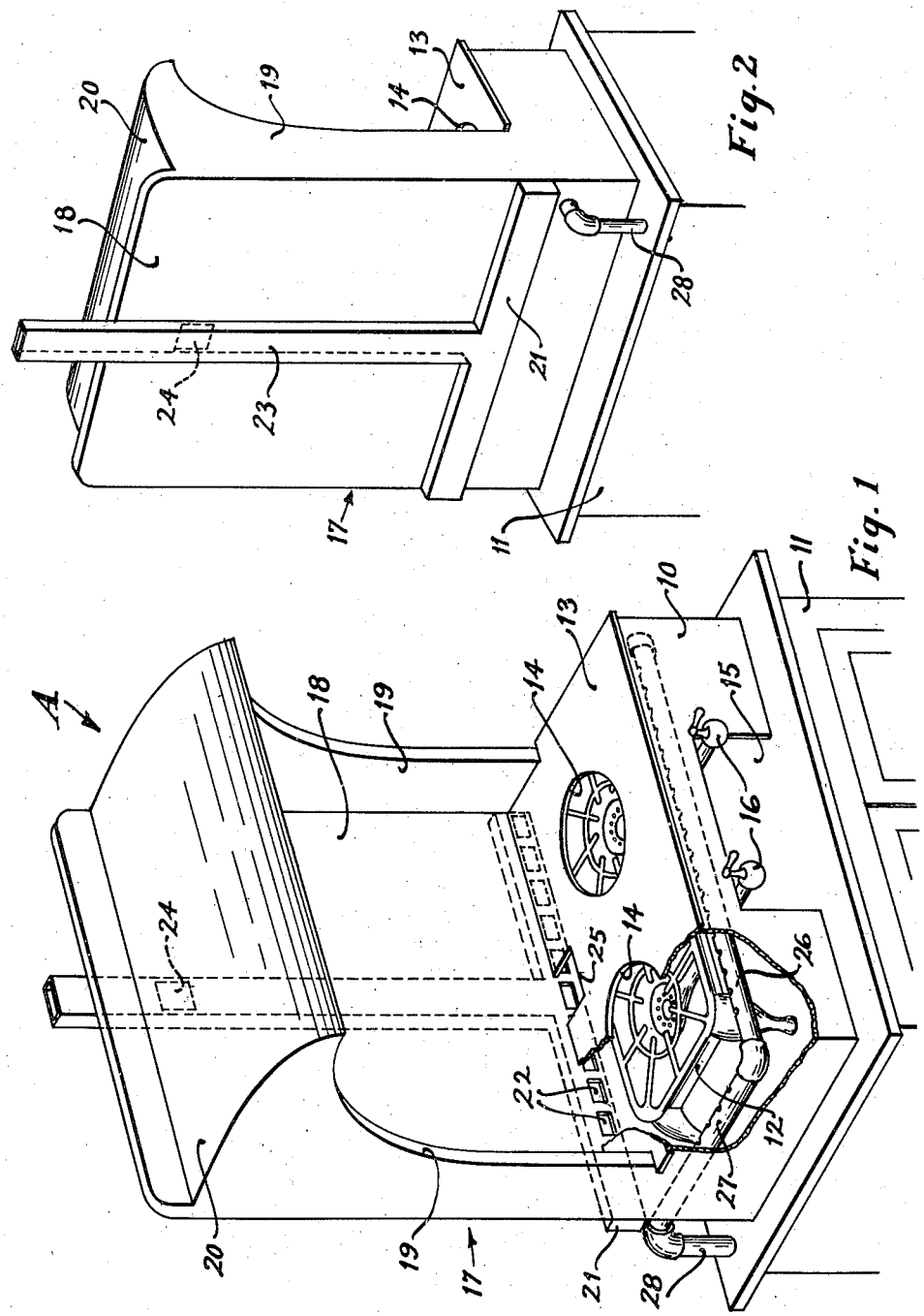
INVENTOR
J. MYKIATIUK
By Fetherstonhaugh & Co.
ATT'YS Patented Feb. 22, 1949

2,462,537

UNITED STATES PATENT OFFICE 2,462,537

SAFETY HOUSING FOR GAS BURNER GRILLS

Joseph Mykiatiuk, Toronto, Ontario, Canada

Application May 1, 1946, Serial No. 666,337

3 Claims. (Cl. 126—299)

This invention relates to a safety housing for gas burner grills.

Gas burner grills are used to a substantial extent but they present two general difficulties. On the one hand, leakage of gas from the burners, either in the case of a faulty valve or in the case of the valve being inadvertently turned on, produces a hazard which might lead to the suffocation of the user since in many cases, such grills are used in bedrooms. On the other hand, the use of an open grill of this kind produces greasy vapours and the like which, when they contact with the walls, ceiling and the like of a room, will coat them, thus creating a dirt nuisance.

These disadvantages are avoided by the present invention. It is an object of the present invention to provide a safety housing for gas burner grills which may be readily employed bodily to encase the grill and to take away gas fumes, as well as to eliminate the indiscriminate projection of greasy vapours and the like.

A further object of the invention is to provide a device of this kind which is generally simple in construction and which may be readily disposed over or removed from encasing a grill of this kind.

A further object of the invention is to provide a housing of this character employing a compartment for encasing the grill and a superstructure including a hood in which means is provided for removing gases, etc. from the compartment and wherein the hood is designed to cooperate in directing gases, vapour and the like into a disposal duct.

A further object of the invention is to provide a device of this kind which, due to its simple character, may be constructed at a particularly low cost.

With these and other objects in view, the invention generally comprises a grill housing unit having an open base giving access to a grill encasing compartment and including a superstructure rising from the base and terminating in a hood, a fume or gas discharging flue being connected with the housing accessible from the compartment and from the area above the compartment below the hood to induce the flow of gases to the flue. Preferably the unit includes a draft stimulating element in the form of a pipe entering into the compartment and having discharge orifices, the pipe being designed for connection with a fan for creating a stimulating draft in the compartment positively to induce flow to the flue.

The invention will be clearly understood by reference to the following detailed specification taken in conjunction with the accompanying drawings.

In the drawings:

Fig. 1 is a perspective illustration of the safety housing looking at the front thereof according to the present invention with parts thereof broken away more clearly to illustrate the construction; and Fig. 2 is a perspective illustration looking at the structure principally from the rear thereof.

Referring to the drawings, A indicates a safety housing as a whole which includes a grill encasing compartment 10 preferably rectangular in shape and open at the bottom. This is designed to rest upon a stand, table or the like 11 upon which the grill 12 is designed to be disposed. The grill encasing compartment is closed at the top preferably by a removable top plate 13 which is formed with the openings 14 to expose the gas burners therebelow. The number of openings 14 and the size of the compartment will be dependent upon the number of burners in the grill which it is designed to encase. The front wall of the compartment 10 is provided with an opening 15 to permit the gas valves 16 of the grill to project therethrough so that they are readily accessible.

A superstructure 17 rises from the back of the compartment 10, being formed with the back wall 18 and partial side walls 19 terminating in the hood 20, extending over said openings 14. The hood 20 is forwardly and downwardly curved, as shown, to provide in its lower surface a curved deflecting or baffle plate. Across the back 18 at its rear is a manifold 21 disposed at the level substantially below the top plate 13. In this area, the back plate is formed with a plurality of gas discharge openings 22 that communicate with the manifold 21.

On the rear surface of the back 18 centrally thereof, a flue 23 is mounted communicating with the manifold 21 and passing upwardly from the superstructure to connect with a discharge such as a chimney flue. The back plate is formed with a large gas discharge orifice 24 adjacent its upper end and below the hood 20, the orifice 24 communicating with the flue 23. In the rear edge of the top plate 13, an orifice 25 is formed which establishes communication between the grill encasing compartment 10 and the atmosphere above the compartment and below the hood 20.

The operation of the structure described is as follows:

When the flue 23 is connected with a chimney flue or the like, a draft is induced in the flue 23 and the manifold 21. Therefore, gases evolving from the use of the burner 12 will be withdrawn when discharged in any way in the compartment 10 through the orifices 22 and into the manifold 21 and flue 23. Likewise, gases rising above the top plate 13 will be caught by the hood 20 and discharged through the orifices 24 into the flue 23. In this connection, the curved character of the hood 20 and the induced flow created by the flue through the enlarged discharge orifice 24 will have the effect of causing the gases to be caught by the hood and flow to discharge through the flue 23. Moreover, in the case where gases within the compartment 10 are not wholly discharged through the orifices 22, they will pass through the orifice 25 in the top plate 13 and will finally be discharged from below the hood through the discharge orifice 24 to flue 23. In this way, therefore, the gases whether arising directly from the burners or from cooking utensils employed on the burners will be substantially eliminated and the apparatus, therefore, operates as a safety housing as well as one which eliminates the accumulation of dirt in a room caused by vapours, grease and the like.

Preferably, the unit includes a means of stimulating air flow to the flue from the grill encasing compartment 10. This may be accomplished by employing an air pipe 26 formed with a plurality of perforations disposed so that they will discharge upwardly and rearwardly towards the orifices 22. The pipe 26 is disposed along the interior of the upper portion of the front wall of compartment 10, as shown, and connects with the lead 27 in turn connected with the feed pipe 28. The latter is designed to be placed in communication with a fan which may be disposed, for instance, below the table 11 and in a compartment of the table if the latter is of cabinet form. A supply of air is, therefore, fed to the pipe 26 under low pressure so that the pipe acts as a breather pipe merely to stimulate flow to the orifices 22 and thus, particularly in the case where a burner may be turned on inadvertently and not ignited, gases are positively discharged through the orifices 22 without contaminating the room and danger to the occupants.

The safety housing may be constructed very economically from sheet metal and, therefore, can be obtainable readily by the average person. Preferably, the sheeting thereof is porcelained or coated so that it is easily cleaned. Thus, a simple unit of utility is provided.

The safety unit provides other advantages. For instance, it lends itself readily to the use of a portable oven which may be disposed on the top plate 13 when the user desires to bake. Moreover, it also provides a slightly enlarged surface as created by the top plate 13 for holding utensils and thus facilitating the use of the grill. Accordingly, therefore, it will be clearly appreciated that the invention provides a simple article of substantial utility, apart from its factors of safety and cleanliness.

What I claim as my invention is:

1. A safety housing for gas grills comprising a base embodying an open bottomed grill encasing compartment, a top plate therefor having orifices designed to register with the burners of a gas grill, a superstructure rising from the compartment embodying a back plate and terminating in a forwardly and downwardly curved hood above said orifices, said back plate being formed with a plurality of orifices below the level of the top plate, a manifold on the back plate with which said orifices communicate, and a flue on the back plate communicating with the manifold, the upper portion of said back plate being formed with at least one gas discharge orifice communicating with said flue, whereby gases generated by the use of the grill are induced to flow through the manifold to the flue and from the hood to the flue.

2. A safety housing for gas grills as claimed in claim 1 in which the top plate is formed with an orifice at its rear edge adjacent to the back plate so that excess gases in the compartment are discharged to the hood whence they are drawn through said gas discharge orifice into said flue.

3. A safety housing for gas grills as claimed in claim 1 in which an air pipe is disposed within the compartment adjacent to its front and positioned to discharge air into the compartment in a direction towards the discharge orifices in the back plate.

JOSEPH MYKIATIUK.

REFERENCES CITED

The following references are of record in the file of this patent:

UNITED STATES PATENTS

| Number | Name | Date |
|---|---|---|
| 607,976 | Amos | July 26, 1898 |
| 868,753 | Barrett | Oct. 22, 1907 |
| 898,814 | Zehring | Sept. 15, 1908 |
| 1,228,956 | Noonan | June 5, 1917 |
| 1,294,159 | Potts | Feb. 11, 1919 |
| 1,584,619 | Lloyd | May 11, 1926 |
| 1,963,281 | Rogers | June 19, 1934 |
| 2,350,293 | Stanchfield | May 30, 1944 |
| 2,376,571 | Brumbaugh | May 22, 1945 |